(12) United States Patent
Liu et al.

(10) Patent No.: US 11,783,633 B2
(45) Date of Patent: *Oct. 10, 2023

(54) MOTION SENSOR USING TEMPORAL DIFFERENCE PIXELS AND LIFT-UP DETECTION THEREOF

(71) Applicant: PIXART IMAGING INC., Hsin-Chu County (TW)

(72) Inventors: Ren-Chieh Liu, Hsin-Chu County (TW); Yi-Hsien Ko, Hsin-Chu County (TW); Han-Chi Liu, Hsin-Chu County (TW)

(73) Assignee: PIXART IMAGING INC., Hsin-Chu County (TW)

(*) Notice: Subject to any disclaimer, the term of this patent is extended or adjusted under 35 U.S.C. 154(b) by 209 days.

This patent is subject to a terminal disclaimer.

(21) Appl. No.: 17/333,022

(22) Filed: May 28, 2021

(65) Prior Publication Data

US 2021/0383143 A1   Dec. 9, 2021

Related U.S. Application Data

(63) Continuation of application No. 16/893,936, filed on Jun. 5, 2020, now Pat. No. 11,055,548.

(51) Int. Cl.
*G06V 40/20* (2022.01)
*G06V 10/94* (2022.01)
*H04N 25/75* (2023.01)

(52) U.S. Cl.
CPC ............ *G06V 40/20* (2022.01); *G06V 10/94* (2022.01); *H04N 25/75* (2023.01)

(58) Field of Classification Search
CPC ........ G06V 40/20; G06V 10/94; H04N 25/75; H04N 25/443; H04N 25/40; H04N 25/77; G01B 11/02
USPC ...................................................... 348/222.1
See application file for complete search history.

(56) References Cited

U.S. PATENT DOCUMENTS

| | | | |
|---|---|---|---|
| 2006/0013485 A1* | 1/2006 | Nitta | H04N 25/68 382/194 |
| 2014/0111437 A1 | 4/2014 | Chen | |
| 2016/0321974 A1 | 11/2016 | Chun et al. | |

* cited by examiner

*Primary Examiner* — Stephen P Coleman
(74) *Attorney, Agent, or Firm* — HAUPTMAN HAM, LLP (57) ABSTRACT

There is provided an optical sensor including a pixel matrix and a readout circuit. The pixel matrix includes multiple pixels arranged in a matrix, and each of the multiple pixels outputs temporal difference pixel data. The readout circuit sequentially reads the pixel matrix using a readout block, and performs the hybrid difference calculation on the temporal difference pixel data of pixels within the readout block. Accordingly, the output of the readout circuit is the data accomplishing temporal difference and spatial difference.

20 Claims, 7 Drawing Sheets

MOTION SENSOR USING TEMPORAL DIFFERENCE PIXELS AND LIFT-UP DETECTION THEREOF

CROSS REFERENCE TO RELATED APPLICATION

This application is a continuation application of U.S. application Ser. No. 16/893,936, filed on Jun. 5, 2020, the full disclosure of which is incorporated herein by reference.

BACKGROUND

1. Field of the Discloser

This disclosure generally relates to a sensor adopting temporal difference pixels and, more particularly, to a motion sensor adopting temporal difference pixels and a lift-up detection of a navigation device.

2. Description of the Related Art

In the sensor having a pixel matrix, in order to detect motion, a readout circuit reads a first image frame from the pixel matrix at a first time and saves the first image frame to a first frame buffer. Then, at a second time, the readout circuit reads a second image frame from the pixel matrix, and saves the second image frame in a second frame buffer.

In the motion recognition, a processor accesses the first image frame from the first frame buffer and accesses the second image frame from the second frame buffer to perform the calculation.

That is, the sensor needs at least two frame buffers.

Accordingly, it is necessary to provide a motion sensor that needs not to previously save pixel data acquired at different times respectively into frame buffers before the pixel calculation.

SUMMARY

The present disclosure provides a motion sensor that performs the spatial difference between multiple pixels during reading temporal difference pixel data from the multiple pixels.

The present disclosure further provides a navigation device that further arranges lift-up detection pixel matrix(s) outside a navigation pixel matrix.

The present disclosure provides a motion sensor including a pixel matrix and a readout circuit. The pixel matrix includes multiple pixels arranged in a matrix, and each of the multiple pixels being configured to output temporal difference pixel data. The readout circuit is configured to sequentially read at least a part of the pixel matrix using a readout block, and calculate a hybrid difference of the temporal difference pixel data between a center pixel and adjacent pixels of the center pixel of the readout block.

The present disclosure further provides a navigation device including a pixel matrix, a readout circuit and multiple comparators. The pixel matrix includes multiple pixels arranged in a matrix, and each of the multiple pixels is configured to output temporal difference pixel data. The readout circuit is configured to sequentially read the pixel matrix using a readout block, and calculate a hybrid difference of the temporal difference pixel data between a center pixel and adjacent pixels of the center pixel of the readout block. Each of the multiple comparators is configured to compare the hybrid difference of an associated readout block calculated by the readout circuit with a predetermined value.

The present disclosure further provides a navigation device including a first pixel region, at least one second pixel region, a readout circuit and a processor. The first pixel region is configured to output a first image data. The at least one second pixel region is arranged at a side of the first pixel region and comprising multiple pixels arranged in a matrix, each of the multiple pixels being configured to output temporal difference pixel data. The readout circuit is configured to read at least a part of each of the at least one second pixel region using a readout block, and calculate a hybrid difference of the temporal difference pixel data between a center pixel and adjacent pixels of the center pixel in the readout block. The processor is configured to calculate displacement of the navigation device according to the first image data, and identify whether the navigation device is lifted up according to the hybrid difference.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The motion sensor and the navigation device of the present disclosure respectively identify the motion and the lift-up according to sequentially temporal and spatial differenced pixel data. The temporal difference and the spatial difference of the present disclosure are performed during reading pixel data from pixels so as to accomplish the hybrid difference calculation in the analog phase.

Figure 1A:
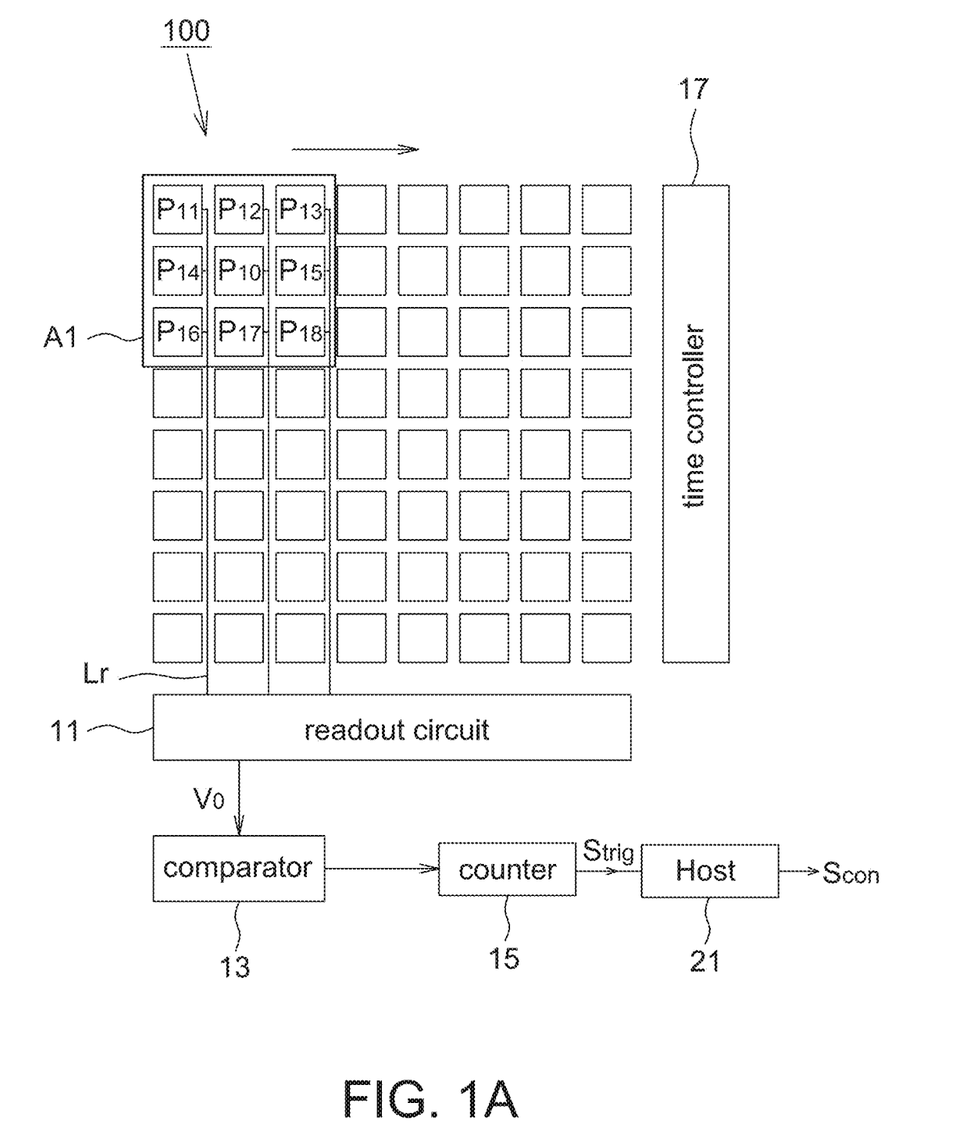
FIGS. 1A-1D are operational schematic diagrams of an optical sensor according to one embodiment of the present disclosure.

Referring to FIG. 1A, it is a schematic diagram of an optical sensor (e.g., a CMOS image sensor, but not limited to) according to one embodiment of the present disclosure. The optical sensor is adapted to, for example, a security system as a motion sensor, but not limited to. The optical sensor generates a trigger signal $S_{trig}$ to a host 21 when detecting the motion so as to activate at least one of a recording procedure, increasing a frame rate of a pixel matrix, turning on a light source, increasing a frame size of image frames outputted by the pixel matrix, but not limited thereto. In some aspects, when the optical sensor does not detect any motion, the host 21 may enter a sleep mode or low power mode to reduce the power consumption.

The host 21 is, for example, arranged at different locations from the optical sensor (e.g., arranged in a camera), but coupled to the optical sensor to transmit control signals and image data therebetween.

The optical sensor includes a pixel matrix 100, a readout circuit 11, a comparator 13, a counter 15 and a timing controller 17, wherein although FIGS. 1A to 1D show that the comparator 13 and the counter 15 are separated circuits, the present disclosure is not limited thereto. In other aspects, the comparator 13 and counter 15 are both included in the readout circuit 11 or in a processor (not shown) of the optical sensor, wherein the processor is, for example, a micro controller unit (MCU), a digital signal processor (DSP) or an application specific integrated circuit (ASIC).

The pixel matrix 100 includes multiple pixels (8×8 pixels being shown in FIGS. 1A-1D as an example) arranged in a matrix. Each of the multiple pixels is used to output temporal difference pixel data. The temporal difference pixel data is, for example, a difference value of charges generated by a photodiode of each of the multiple pixels between a current time and a reference time (e.g., a new reference time being set every a predetermined time interval during operation). Or, the temporal difference pixel data is, for example, a difference value of charges generated by a photodiode of each of the multiple pixels between a current time and a previous time separated by a frame period.

The pixel structure capable of calculating and outputting the temporal difference pixel data is known to the art and is not a main objective of the present disclosure, e.g. referencing to FIG. 1(a) of a document entitled "Event-based Vision: A Survey" from https://arxiv.org/pdf/1904.08405, the full disclosure of which is incorporated herein by reference. The present disclosure is to use the temporal difference pixel data to realize the motion detection and lift-up detection.

The temporal difference pixel data is determined according to the pixel circuit being adopted. In one non-limiting aspect, when charges generated by the photodiode between two times are increased to be more than a predetermined threshold, a high voltage (e.g., indicated by "1") is outputted as the temporal difference pixel data; whereas when charges generated by the photodiode between two times are decreased to be lower than a predetermined threshold, a low voltage (e.g., indicated by "0") is outputted as the temporal difference pixel data; or vice versa. That is, the temporal difference pixel data is a voltage difference caused by charges generated by the photodiode between two times, i.e. current and reference times or current and previous times.

The readout circuit 11 sequentially reads the pixel matrix 100 using a readout block, and calculates the spatial difference of the temporal difference pixel data between a center pixel and adjacent pixels of the center pixel of the readout block.

For example in FIG. 1A, the readout circuit 11 reads 9 temporal difference pixel data from a center pixel P10 and adjacent pixels P11 to P18 of the center pixel P10 of the readout block A1 simultaneously at a first time. The pixel data that can be read by the readout circuit 11 is determined by control signals (e.g., row selection signals and readout signals) from the timing controller 17.

In one non-limiting aspect, when reading the 9-temporal difference pixel data, the readout circuit 11 first calculates difference values between the temporal difference pixel data of the center pixel P10 and the temporal difference pixel data of each of the adjacent pixels P11 to P18 as a way of calculating the spatial difference. Then, the readout circuit 11 calculates a summation of 8 absolute values of the calculated 8 difference values as a hybrid difference of the 9 pixels. The comparator 13 then compares the summation with a predetermined value (e.g., a voltage value, a current value or a charging/discharging time according to different applications) to determine a brightness variation within the readout block A1. The counter 15 increases a count value by 1 when the hybrid difference of the readout block A1 is larger than or equal to the predetermined value; otherwise, the count value is not increased.

Figure 1B:
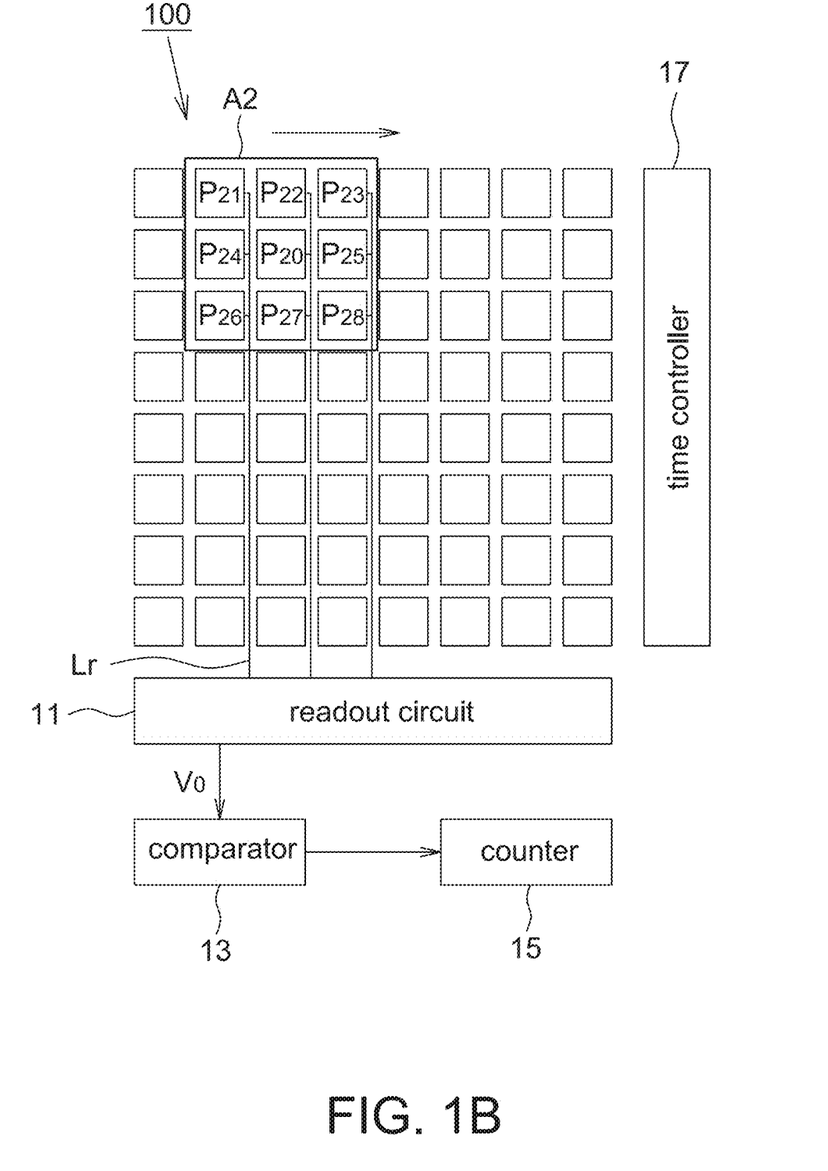
Figure 1C:
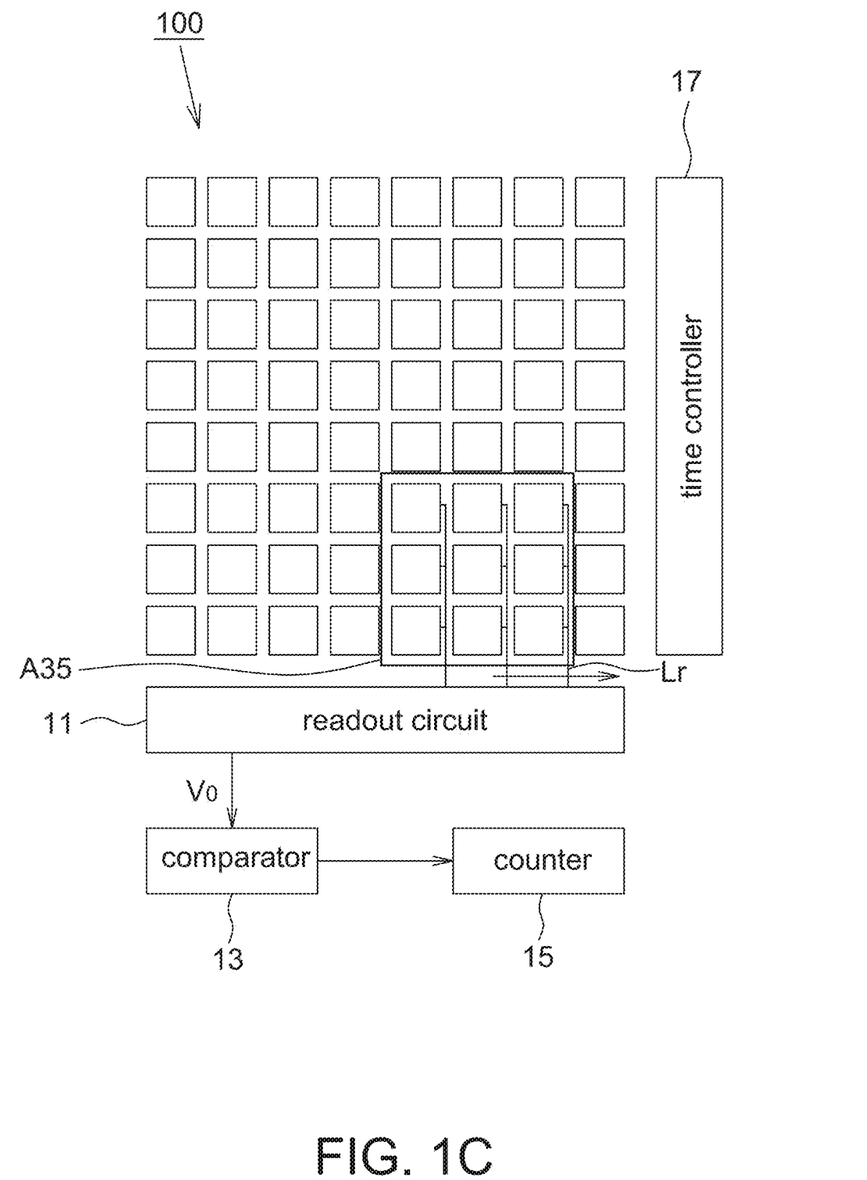

Next, the readout block 100 moves one pixel pitch rightward to a position A2 as shown in FIG. 1B. The readout circuit 11 reads 9-temporal difference pixel data from a center pixel P20 and adjacent pixels P21 to P28 of the center pixel P20 of the readout block A2 simultaneously at a second time. The readout circuit 11 calculates a summation of 8 absolute values of the calculated 8 difference values as a hybrid difference of the 9 pixels in the readout block A2 similar to calculating the hybrid difference of the readout block A1 mentioned above. The comparator 13 also compares the summation of the readout block A2 calculated by the readout circuit 11 with the predetermined value. The counter 15 also increases the count value by 1 when the hybrid difference of the readout block A2 is larger than or equal to the predetermined value; otherwise, the count value is not increased.

Figure 1D:
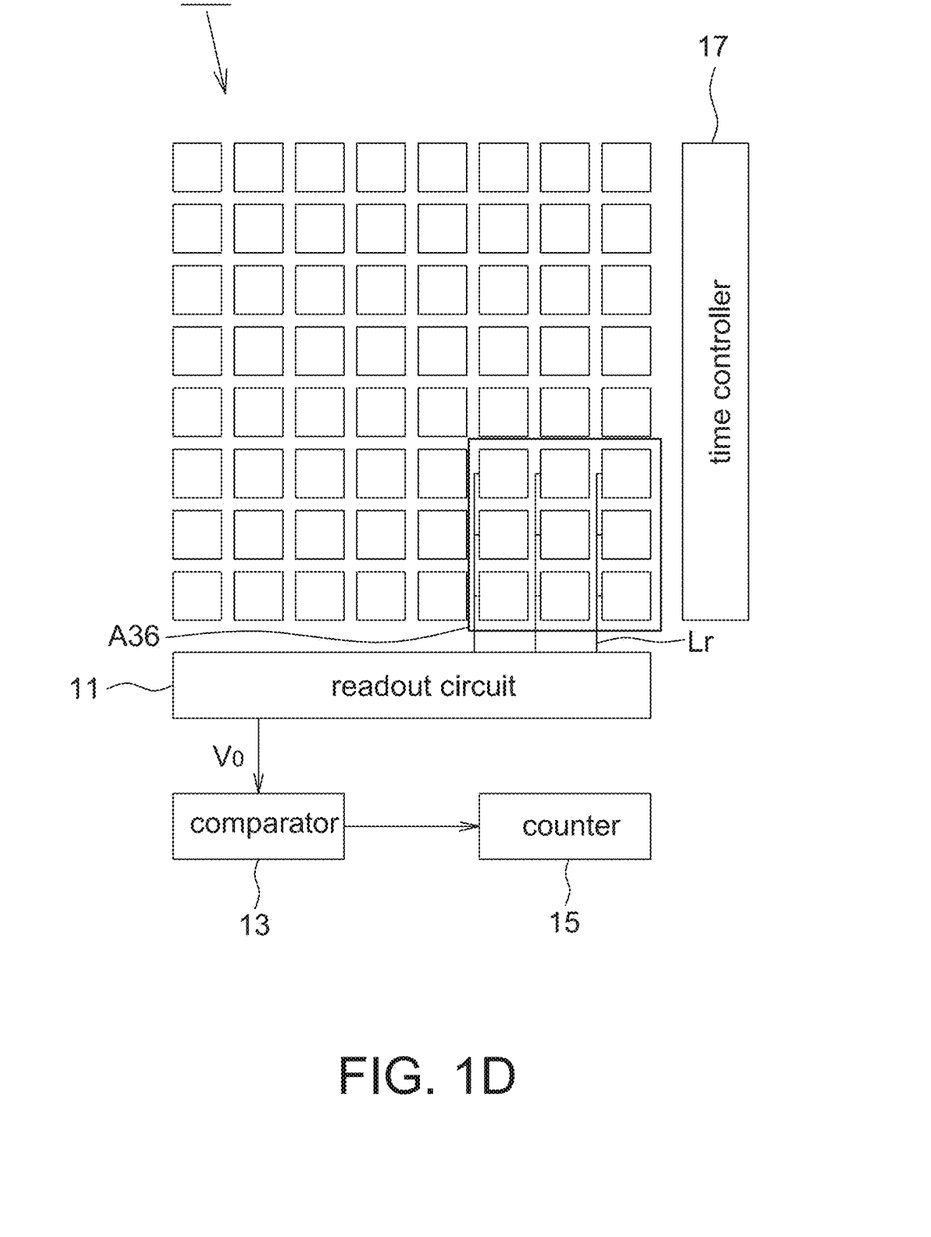

The time controller 17 sequentially controls readable pixels in the pixel matrix 100 to allow the readout circuit 11 to sequentially (e.g., firstly rightward and then downward) read all pixels in the pixel matrix 100 till a hybrid difference of the readout block A36 (as shown in FIG. 1D) is calculated and compared with the predetermined value by the comparator 13. In this aspect, the hybrid differences associated with the readout blocks A1 to A36 are values after the temporal difference and spatial difference sequentially.

The counter 15 counts/accumulates a number of readout blocks in the pixel matrix 100 having the hybrid difference larger than or equal to the predetermined value. When the counted/accumulated number is larger than or equal to a predetermined number (e.g., a counting threshold which is a predetermined ratio of a number of pixels of the pixel matrix 100), it means that the motion is detected and the counter 15 sends a trigger signal $S_{trig}$ to the host 21.

It should be mentioned that, in another aspect, as long as the counted/accumulated number is larger than or equal to the predetermined number, the scanning of the pixel matrix 100 is stopped and the counter 15 sends a trigger signal $S_{trig}$ to the host 21. That is, the readout circuit 11 is not necessary to read till the last readout block A36 if the predetermined number is reached in any previous readout block.

FIGS. 1A to 1D only show readout lines Lr connecting the readout circuit 11 and readable pixels to indicate the temporal difference pixel data of these pixels can be read by the readout circuit 11 via the readout line Lr. Other non-readable pixels are not shown to be connected to the readout line Lr for simplification purpose. The arrow symbols in FIGS. 1A to 1D indicate a moving direction of the readout block.

It should be mentioned that although FIGS. 1A to 1D show that the readout blocks A1 to A36 are respectively a pixel range including 3×3 pixels, the present disclosure is not limited thereto. In the aspect that the pixel matrix 100 includes more pixels, the readout block is selected to include more pixels, e.g., a pixel range having 5×5 pixels.

Figure 2:
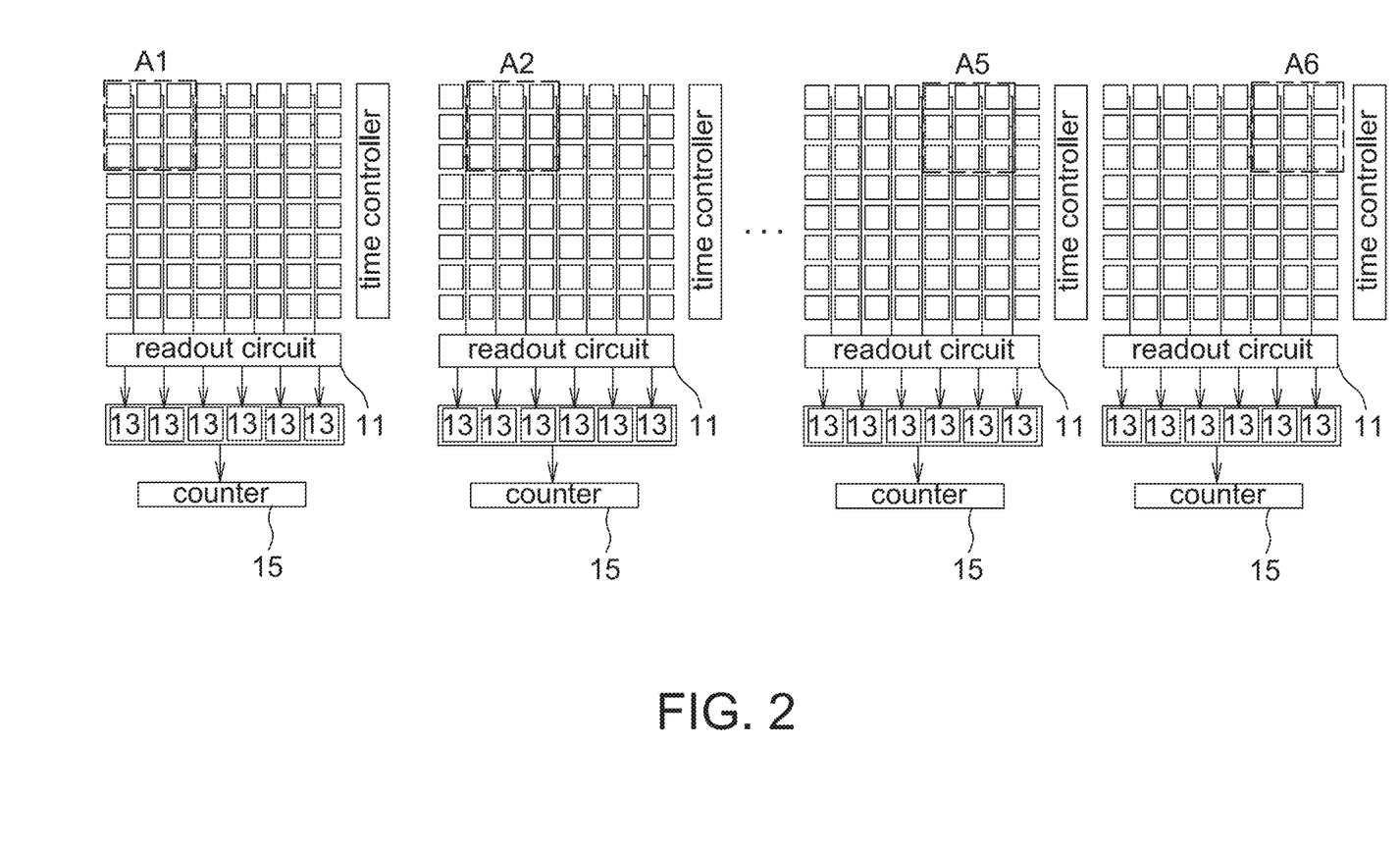
FIG. 2 is an operational schematic diagram of an optical sensor according to another embodiment of the present disclosure.

Referring to FIG. 2, in another aspect, the optical sensor includes six comparators 13. The readout circuit 11 simultaneously reads 3 rows of pixel data of the pixel matrix 100, and obtains the hybrid difference of every readout block A1 to A6 using the same way mentioned above. The comparators 13 then compare the hybrid difference with a predetermined value to determine a brightness variation of every readout block A1 to A6. For example, the most left comparator 13 compares the hybrid difference associated with the readout block A1 with the predetermined value; the second-left comparator 13 compares the hybrid difference associated with the readout block A2 with the predetermined value; . . . ; the second-right comparator 13 compares the hybrid difference associated with the readout block A5 with the predetermined value; and the most right comparator 13 compares the hybrid difference associated with the readout block A6 with the predetermined value. The counter 15 counts a number of readout blocks A1 to A6 having the hybrid difference larger than the predetermined value.

Then, the 3 pixel rows to be read by the readout circuit 11 moves one pixel pitch downward each time till the last row of the pixel matrix 100 is read or scanned, and the readout circuit 11, comparators 13 and the counter 15 repeat the process as mentioned in the previous paragraph. The counter sends a trigger signal $S_{trig}$ when a predetermined counted number is reached (after scanning all pixels or a part of pixels of the pixel matrix 100). It is appreciated that when the pixel matrix has more columns, more comparators 13 may be used.

Figure 3:
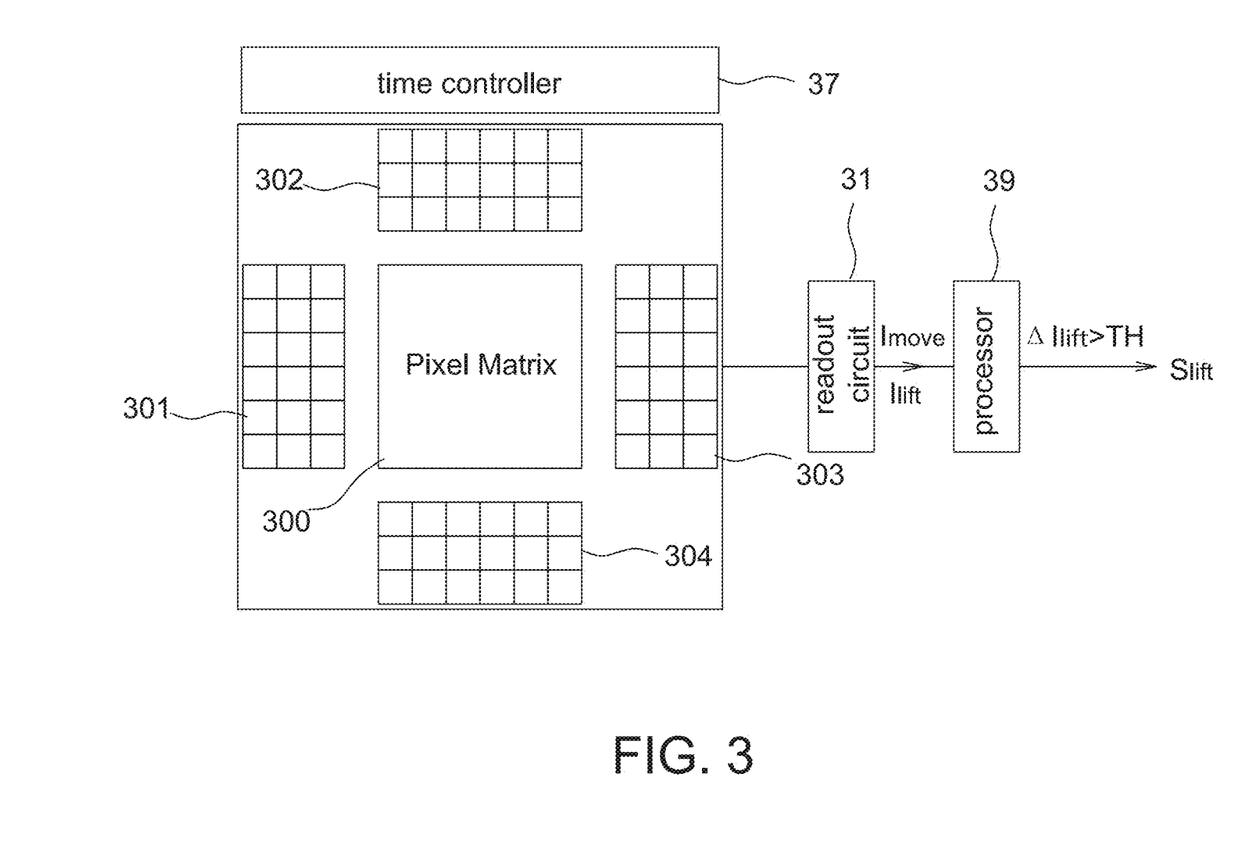
FIG. 3 is a schematic block diagram of a navigation device according to one embodiment of the present disclosure.

Please referring to FIG. 3, it is a schematic diagram of a navigation device according to one embodiment of the present disclosure. The navigation device is, for example, an optical mouse having an optical sensor (e.g., a CMOS image sensor, but not limited thereto) which includes a first pixel region 300, at least one second pixel region (e.g., 4 second pixel regions 301 to 304 respectively arranged at 4 sides of the first pixel region 300 being shown herein), a readout circuit 31, a timing controller 37 and a processor 39, wherein the processor 39 includes, for example, an MCU, a DSP or an ASIC. The timing controller 37 is used to generate control signals (e.g., including row selection signals and readout signals) to cause the readout circuit 31 to read pixel data of every pixel.

It should be mentioned that although FIG. 3 shows that the second pixel regions 301 to 304 are separated from the first pixel region 300 by a distance, the present disclosure is not limited thereto. In other aspects, the second pixel regions 301 to 304 are connected to the first pixel region 300.

Figure 4:
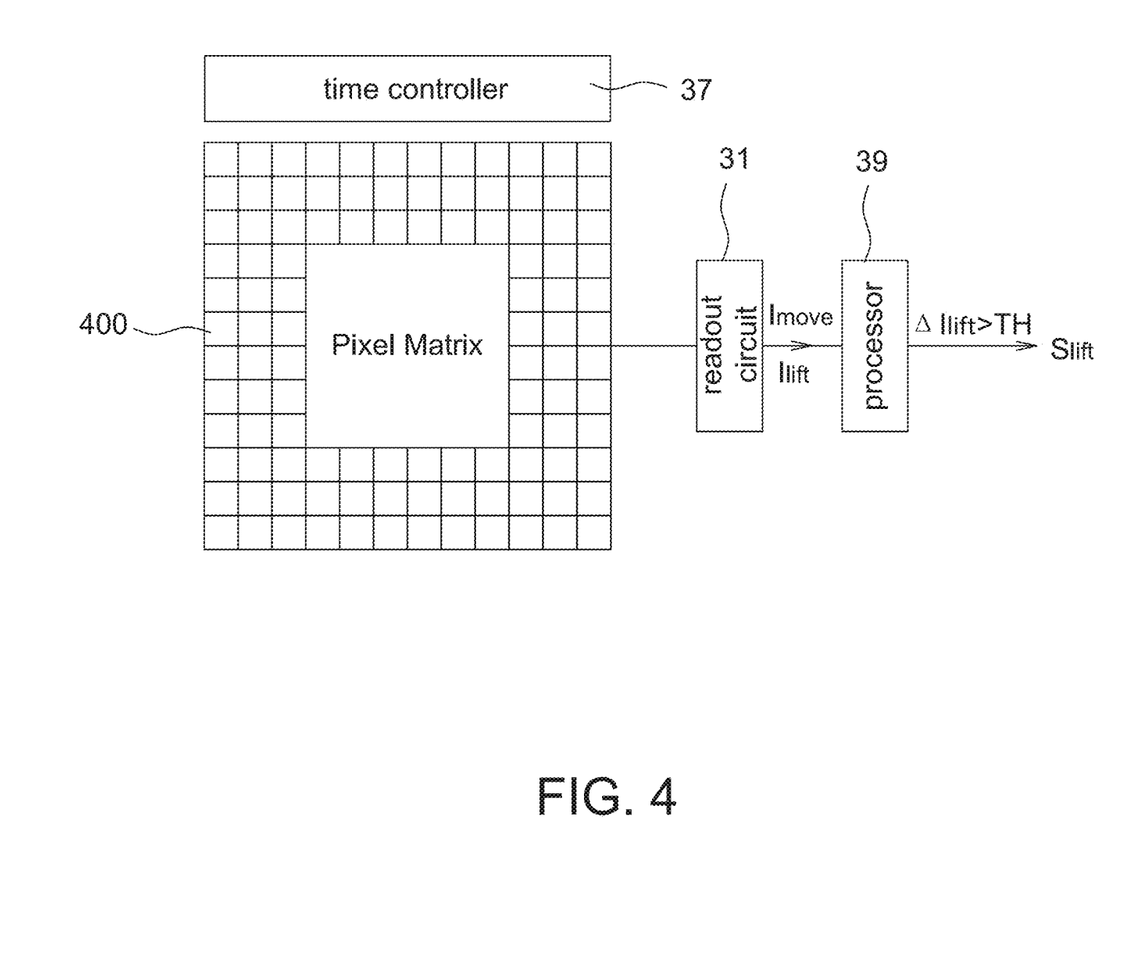
FIG. 4 is a schematic block diagram of a navigation device according to another embodiment of the present disclosure.

It should be mentioned that although FIG. 3 shows that the first pixel region 300 and the second pixel regions 301 to 304 are read by the same readout circuit 31, the present disclosure is not limited thereto. In other aspects, the first pixel region 300 and the second pixel regions 301 to 304 are read by different readout circuits, respectively. In one aspect, the first pixel region 300 and the second pixel regions 301 to 304 are arranged in the same base layer. As shown in FIG. 4, the second pixel region (e.g., shown by the grid region) and the first pixel region (e.g., shown by the blank region) are different regions of the same pixel matrix 400.

This embodiment is described below using FIG. 3. One of ordinary skill in the art would understand the operation of FIG. 4 after understanding the operation of FIG. 3.

The first pixel region 300 is used to output first image data A size of the first image data is determined according to a number of pixels included in a pixel matrix of the first pixel region 300. The readout circuit 31 outputs first image data $I_{move}$ to the processor after reading the first pixel region 300.

The second pixel regions 301 to 304 are arranged at four sides of the first pixel region 300. Each of the second pixel regions 301 to 304 is used to output second image data, respectively. More specifically, after reading the second pixel regions 301 to 304, the readout circuit 31 respectively outputs second image data $I_{lift}$ corresponding to each of the second pixel regions 301 to 304 to the processor 39. For example in FIG. 3, the readout circuit 31 outputs one first image data $I_{move}$ and four second image data $I_{lift}$ per frame period. In one aspect, the first image data $I_{move}$ and the second image data $I_{lift}$ contain pixel data captured in a current exposure period, but does not contain temporal difference pixel data. Frequencies of generating the first image data $I_{move}$ and the second image data $I_{lift}$ are identical to or different from each other without particular limitations.

The processor 39 calculates displacement of the navigation device according to the first image data $I_{move}$. The method of calculating the displacement is known to the art, and thus details thereof are not described herein. For example, the processor 39 calculates the displacement of the navigation device by comparing (e.g., calculating correlation) successive captured first image data $I_{move}$. The displacement is used to control, for example, a cursor shown on the display device.

The processor 39 further identifies whether the navigation device is lifted up according to the second image data $I_{lift}$. In one aspect, the processor 39 calculates a summation or an average pixel value of the second image data $I_{lift}$. The processor 39 identifies whether the navigation device is lifted up or not according to an absolute value of the summation or the average pixel value. For example, when the absolute value is larger than or equal to a threshold, it means that the navigation device is lifted up.

In another aspect, the processor 39 identifies whether the navigation device is lifted up or not according to a difference value of the absolute values between two second pixel regions, e.g., between 301 and 303 or between 302 and 304. For example, when the difference value is larger than or equal to a variation threshold, it means that the navigation device is lifted up; whereas when the difference value does not exceed the variation threshold, it means that the navigation device is not lifted up.

The second average pixel value is larger than or smaller than the first average pixel value depending on whether the second pixel regions 301 to 304 receive light emitted by a light source when the navigation device is not lifted up. When the processor 39 identifies that the temporal difference (i.e. from the first to second time) of one of the second pixel regions 301 to 304 is larger than or equal to the variation threshold, it means that at least one side of the navigation device is lifted up by a user. For example, when the absolute value associated with the second pixel region 301 is larger than or equal to the variation threshold, it means that a left side of the navigation device is lifted up by the user; when the absolute value associated with the second pixel region 302 is larger than or equal to the variation threshold, it means that an upper side of the navigation device is lifted up by the user; and so on.

When identifying that at least one side of the navigation device is lifted up by the user, the processor 39 generates a lift up signal $S_{lift}$ to perform corresponding controls, e.g., stopping control the cursor according to the displacement calculated from the first image data $I_{move}$, entering a power saving mode to reduce a frame rate of the sensor array 300 or turning off the light source, but not limited thereto. In one non-limiting aspect, the processor 39 performs different controls according to different sides of the navigation device being lifted up. For example, when the upper side of the navigation device is lifted up by the user, the cursor is controlled by a different ratio or a different multiple according to the displacement calculated from the first image data $I_{move}$; whereas when a lower side of the navigation device is lifted up by the user, the cursor is not controlled according to the displacement calculated from the first image data $I_{move}$, but the present disclosure is not limited thereto.

In another aspect, each pixel of the second pixel regions 301 to 304 is used to output temporal difference pixel data to form the second image data $I_{lift}$. As mentioned above, the temporal difference pixel data is a difference value of charges generated by a photodiode of the each pixel between a current time and a reference time; or a difference value of charges generated by a photodiode of the each pixel between a current time and a previous time separated by a frame period. In this aspect, the processor 39 is used to count a number of pixels, in each of the second image data $I_{lift}$ outputted by the second pixel regions 301 to 304, having the temporal difference pixel data larger than or equal to a predetermined threshold (e.g., counting a number of pixels outputting "1") to accordingly identify whether the navigation device is lifted up.

It should be mentioned that the processor 39 is not necessary to count all pixels of one second image data $I_{lift}$ to identify the lift. The lift is confined once the counted number of pixels of one second pixel region having a significant temporal difference pixel data (i.e. larger than or equal to a predetermined threshold) is larger than or equal to a predetermined counting threshold, After the lift is confirmed, the lift up signal $S_{lift}$ is sent and the counting is stopped.

In other words, when the navigation device is lifted up, pixel values at different times (i.e. the temporal difference pixel data) have a larger variation. Therefore, in this aspect, the processor 39 identifies a lift-up event by comparing the temporal difference pixel data with a predetermined threshold or value, and counting a number of pixels whose pixel values have a significant variation exceeding predetermined threshold or value). The setting of the predetermined threshold and value reduces the noise interference.

As mentioned above, the processor 39 performs predetermined controls when a lift-up event is identified.

In the aspect that each of multiple pixels in the second pixel regions 301 to 304 outputs temporal difference pixel data, the readout circuit 31 further performs the spatial difference on the temporal difference pixel data to form a hybrid difference. The processor 39 (e.g., including a comparator and a counter) then identifies whether the navigation device is lifted up according to the hybrid difference.

More specifically, the readout circuit 31 reads each of the second pixel regions 301 to 304 using the readout block similar to FIGS. 1A to 1D, and calculates the spatial difference of the temporal difference pixel data between a center pixel and adjacent pixels of the center pixel, referring to the descriptions mentioned above. In this case, to allow the readout block to be able to sequentially scan the second pixel regions 301 to 304, each of the second pixel regions 301 to 304 includes at least 3×3 pixels. It is appreciated that when the readout block contains a pixel region having 5×5 pixels, each of the second pixel regions 301 to 304 includes at least 5×5 pixels.

In the aspect shown in FIG. 3, each of the second pixel regions 301 to 304 outputs 4 hybrid differences obtained by the readout circuit 31 using 4 readout blocks to scan the second pixel regions 301 to 304, respectively. As mentioned above, the readout circuit 31 calculates a difference value between the temporal difference pixel data of the center pixel and the temporal difference pixel data of each of the adjacent pixels and calculates a summation of 8 absolute values of the calculated difference values as the hybrid difference.

After receiving the hybrid differences from the readout circuit 31, the processor 39 compares the hybrid difference associated with each readout block with a predetermined value. When the hybrid difference of one readout block is larger than or equal to the predetermined value, a count value is increased by 1; on the contrary, the count value is not increased. The processor 39 counts a number of readout blocks with the hybrid difference thereof being larger than or equal to the predetermined value corresponding to each of the second pixel regions 301 to 304. When the counted number of readout blocks of one of the second pixel regions 301 to 304 is larger than or equal to a predetermined number, the navigation device is identified to be lifted up.

As mentioned above, the processor 39 is not necessary to count all readout blocks by scanning all pixels of each of the second pixel regions 301 to 304. As long as the predetermined number of one second pixel region is reached, the lift associated with the one second pixel region is confirmed and the scan is stopped.

For example, when more than 2 (i.e. the threshold being 2) readout blocks among 4 readout blocks (e.g., generated by scanning the second pixel region 301 in a longitudinal direction using control signals from the timing controller 37) of the second pixel region 301 have the hybrid difference larger than or equal to the predetermined value, it means that the left side of the navigation device is lifted up; and other sides can be identified using a similar way. The threshold is set according to different applications as long as it is smaller than or equal to a number of the readout blocks used in one second pixel region.

In this aspect, the processor 39 also calculates displacement of the navigation device according to the first image data $I_{move}$ as illustrated above.

As mentioned above, when identifying a lift-up event, the processor 39 performs the corresponding controls.

The $\Delta I_{lift}$ shown in FIGS. 3 and 4 is used to indicate a variation of an average pixel value, a counted number of pixels or a counted number of readout blocks in representing the time-variation of charges generated by the photodiode.

It should be mentioned that the values in the above embodiments, e.g., a number of pixels, a number of matrices and the threshold are only intended to illustrate but not to limit the present disclosure.

As mentioned above, in the conventional sensor having a pixel matrix, at least two frame buffers are required to temporarily store image frames outputted by the pixel matrix at different times. Therefore, the present disclosure further provides a motion sensor (e.g., as shown in FIGS. 1A-1D) and a navigation device (as shown in FIGS. 3-4) that uses a pixel matrix to output temporal difference pixel data. Then, the temporal difference pixel data at different positions of a readout block is spatial-differenced so as to accomplish the hybrid difference calculation during reading pixel data without using the frame buffer. The processor directly performs the following controls according to the result of hybrid difference such that the temporal difference calculation is not performed in the digital phase.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A motion sensor, comprising:
   a pixel matrix, comprising multiple pixels arranged in a matrix, and each of the multiple pixels being configured to output temporal difference pixel data; and
   a readout circuit, configured to sequentially read at least a part of the pixel matrix using a readout block, and calculate a hybrid difference of the temporal difference pixel data between a center pixel and adjacent pixels of the center pixel of the readout block.

2. The motion sensor as claimed in claim 1, wherein the temporal difference pixel data is
a difference value of charges generated by a photodiode of the pixels between a current time and a reference time; or
a difference value of charges generated by a photodiode of the pixels between a current time and a previous time separated by a frame period.

3. The motion sensor as claimed in claim 1, wherein the readout block is a pixel range including 3×3 pixels or 5×5 pixels.

4. The motion sensor as claimed in claim 1, further comprising a comparator configured to compare the hybrid difference of each readout block calculated by the readout circuit with a predetermined value.

5. The motion sensor as claimed in claim 4, further comprising a counter configured to
count a number of the readout blocks in the pixel matrix having the hybrid difference larger than the predetermined value, and
generate a trigger signal when the number of the readout blocks is larger than or equal to a predetermined number,
wherein the readout circuit stops reading the pixel matrix using the readout block when the number of the readout blocks is larger than or equal to the predetermined number.

6. The motion sensor as claimed in claim 5, wherein the trigger signal is configured to activate a recording procedure, increase a frame rate of the pixel matrix, turn on a light source, increase a frame size of image frames outputted by the pixel matrix.

7. The motion sensor as claimed in claim 1, wherein the readout circuit is configured to
calculate a difference value between the temporal difference pixel data of the center pixel and the temporal difference pixel data of each of the adjacent pixels, and
calculate a summation of absolute values of the calculated difference values as the hybrid difference.

8. A motion sensor, comprising:
a pixel matrix, comprising multiple pixels arranged in a matrix, and each of the multiple pixels being configured to output temporal difference pixel data;
a readout circuit, configured to sequentially read the pixel matrix using a readout block, and calculate a hybrid difference of the temporal difference pixel data between a center pixel and adjacent pixels of the center pixel of the readout block; and
multiple comparators each being configured to compare the hybrid difference of an associated readout block calculated by the readout circuit with a predetermined value.

9. The motion sensor as claimed in claim 8, further comprising a counter configured to
count a number of the readout blocks in the pixel matrix having the hybrid difference larger than or equal to the predetermined value, and
generate a trigger signal when the number of the readout blocks is larger than a predetermined number.

10. The motion sensor as claimed in claim 9, wherein the trigger signal is configured to activate a recording procedure, increase a frame rate of the pixel matrix, turn on a light source, increase a frame size of image frames outputted by the pixel matrix.

11. The motion sensor as claimed in claim 8, wherein the temporal difference pixel data is
a difference value of charges generated by a photodiode of the pixels between a current time and a reference time; or
a difference value of charges generated by a photodiode of the pixels between a current time and a previous time separated by a frame period.

12. The motion sensor as claimed in claim 8, wherein
the readout block is a pixel range including 3×3 pixels or 5×5 pixels, and
each of the multiple comparators is configured to compare the hybrid difference of the associated readout block of the 3×3 pixels or the 5×5 pixels with the predetermined value.

13. The motion sensor as claimed in claim 8, wherein the readout circuit is configured to
calculate a difference value between the temporal difference pixel data of the center pixel and the temporal difference pixel data of each of the adjacent pixels, and
calculate a summation of absolute values of the calculated difference values as the hybrid difference.

14. A navigation device, comprising:
a first pixel region, configured to output a first image data;
at least one second pixel region, arranged at a side of the first pixel region and comprising multiple pixels arranged in a matrix, each of the multiple pixels being configured to output temporal difference pixel data;
a readout circuit, configured to read at least a part of each of the at least one second pixel region using a readout block, and calculate a hybrid difference of the temporal difference pixel data between a center pixel and adjacent pixels of the center pixel in the readout block; and
a processor, configured to calculate displacement of the navigation device according to the first image data, and identify whether the navigation device is lifted up according to the hybrid difference.

15. The navigation device as claimed in claim 14, wherein the temporal difference pixel data is
a difference value of charges generated by a photodiode of the pixels between a current time and a reference time; or
a difference value of charges generated by a photodiode of the pixels between a current time and a previous time separated by a frame period.

16. The navigation device as claimed in claim 14, wherein the at least one second pixel region comprises at least 3×3 pixels.

17. The navigation device as claimed in claim 14, wherein the readout circuit is configured to
compare the hybrid difference of each readout block calculated by the readout circuit with a predetermined value,
count, corresponding to each of the at least one second pixel region, a number of the readout blocks having the hybrid difference larger than the predetermined value, and
identify that the navigation device is lifted up and stop counting the number of the readout blocks when the number of the readout blocks of one of the at least one second pixel region is larger than or equal to a predetermined number.

18. The navigation device as claimed in claim 14, wherein the readout circuit is configured to
calculate a difference value between the temporal difference pixel data of the center pixel and the temporal difference pixel data of each of the adjacent pixels, and
calculate a summation of absolute values of the calculated difference values as the hybrid difference.

19. The navigation device as claimed in claim 14, wherein the navigation device comprises 4 second image regions respectively arranged at 4 sides of the first pixel region.

20. The navigation device as claimed in claim 14, wherein the at least one second pixel region and the first pixel region are respectively different regions of a same pixel matrix.

\* \* \* \* \*